(12) United States Patent
Zimdars et al.

(10) Patent No.: US 8,390,910 B2
(45) Date of Patent: Mar. 5, 2013

(54) OPTICAL DELAY

(75) Inventors: David A. Zimdars, Ann Arbor, MI (US); Artur Chernovsky, Crofton, MD (US); Steven L. Williamson, Ann Arbor, MI (US); Klaus Wolter, Dexter, MI (US)

(73) Assignee: Picometrix, LLC, Ann Arbor, MI (US)

( * ) Notice: Subject to any disclaimer, the term of this patent is extended or adjusted under 35 U.S.C. 154(b) by 1283 days.

(21) Appl. No.: 11/576,215

(22) PCT Filed: Sep. 30, 2005

(86) PCT No.: PCT/US2005/035478
§ 371 (c)(1),
(2), (4) Date: Mar. 26, 2008

(87) PCT Pub. No.: WO2006/039645
PCT Pub. Date: Apr. 13, 2006

(65) Prior Publication Data
US 2008/0259428 A1  Oct. 23, 2008

Related U.S. Application Data

(60) Provisional application No. 60/614,793, filed on Sep. 30, 2004.

(51) Int. Cl.
*G02B 26/12* (2006.01)
(52) U.S. Cl. ............. 359/212.1; 359/223.1; 359/226.1; 359/835

(58) Field of Classification Search ............... 359/211.3, 359/831, 833, 834, 835, 836, 212.1, 212.2, 359/216.1, 223.1, 226.1
See application file for complete search history.

(56) References Cited

U.S. PATENT DOCUMENTS

| | | | | | |
|---|---|---|---|---|---|
| 2,217,236 | A | * | 10/1940 | Schafer | 356/230 |
| 2,840,632 | A | * | 6/1958 | Parker | 348/196 |
| 2,906,161 | A | * | 9/1959 | Thompson | 356/153 |
| 3,632,871 | A | * | 1/1972 | Watkins et al. | 348/203 |
| 4,019,804 | A | * | 4/1977 | Collier | 359/216.1 |
| 4,201,222 | A | * | 5/1980 | Haase | 600/311 |
| 4,320,941 | A | * | 3/1982 | Dashwood et al. | 352/111 |
| 4,747,647 | A | * | 5/1988 | de Zoeten et al. | 359/216.1 |
| 5,289,493 | A | * | 2/1994 | Fink | 372/94 |
| 6,344,846 | B1 | * | 2/2002 | Hines | 345/166 |
| 6,407,872 | B1 | * | 6/2002 | Lai et al. | 359/833 |
| 6,575,368 | B1 | * | 6/2003 | Tamburrini et al. | 235/462.25 |
| 6,669,145 | B1 | * | 12/2003 | Green | 244/135 A |

* cited by examiner

*Primary Examiner* — Ricky D Shafer
(74) *Attorney, Agent, or Firm* — Brinks Hofer Gilson & Lione

(57) ABSTRACT

A system for varying a delay of an optical beam has a rotatable wheel and a set of one or more prisms mounted about a circumference of the rotatable wheel. The set of one or more prisms are positioned to retroreflect the optical beam that passes approximately tangent to the rotatable wheel to cause a delay or phase shift to the beam as the rotatable wheel rotates.

24 Claims, 7 Drawing Sheets

OPTICAL DELAY

CROSS REFERENCE TO RELATED APPLICATIONS

This application claims priority to International Patent Application PCT/US2005/035478 filed Sep. 30, 2005, which claims priority to U.S. Provisional Patent Application 60/614,793 Sep. 30, 2004, both of which are incorporated by reference.

BACKGROUND

The present invention generally relates to the field of optics.

Optical delays are commonly employed in time-domain and low-coherent systems. For instance, some systems employ an optical delay to determine the time or phase differences relative to a reference beam, as is the case in a pump-probe measurement for investigating samples. This is performed by providing a delay line in the path of one of the beams to vary its path length relative to the second beam. The beams in such experiments could be comprised of a series of short optical pulses or are continuous-wave beams, as in the case of low-coherence measurement systems.

Some delay lines implement retroreflectors to turn the beam back in the opposite direction. The retroreflectors typically reciprocate to extend or shorten the optical path. However, the speed of the acquisition of information depends on the speed at which the retroreflector can be reciprocated. Hence, these types of delay lines generally cannot be employed in high-speed systems that also require long delay times.

In view of the above, it is apparent that there exists a need for an optical delay that can be employed in optical systems capable of high-speed sampling, such as imaging systems.

SUMMARY

In satisfying the above need, as well as overcoming the enumerated drawbacks and other limitations of the related art, the present invention provides an optical delay line device for use in various types of optical systems.

In a general aspect, the optical delay line varies the delay of an optical beam and includes a rotatable wheel and one or more prisms mounted about the circumference of the wheel and positioned to retroreflect the optical beam that passes approximately tangent to the wheel to cause a delay or phase shift to the beam as the wheel rotates.

In another aspect, a prism mounted on a movable member and positioned to retroreflect the optical beam that is directed along the path of motion of the prism to cause a delay or phase shift to the beam as the member moves. The movable member can be a reciprocating slide or a pivoting arm.

Further features and advantages will be apparent in view of the description, and from the claims.

DETAILED DESCRIPTION

Figure 1A:
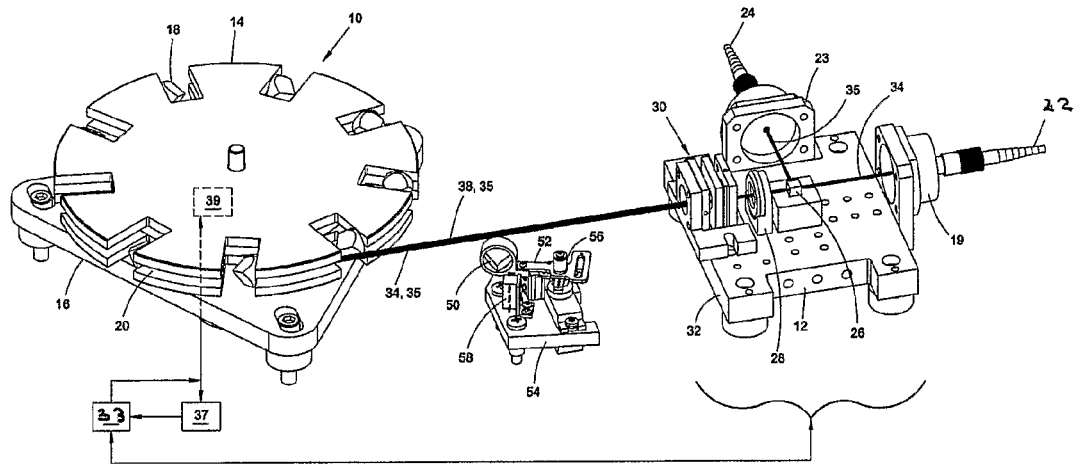
FIG. 1a is a perspective view of an optical delay line with an optical circulator in accordance with an embodiment of the invention.
Figure 1B:
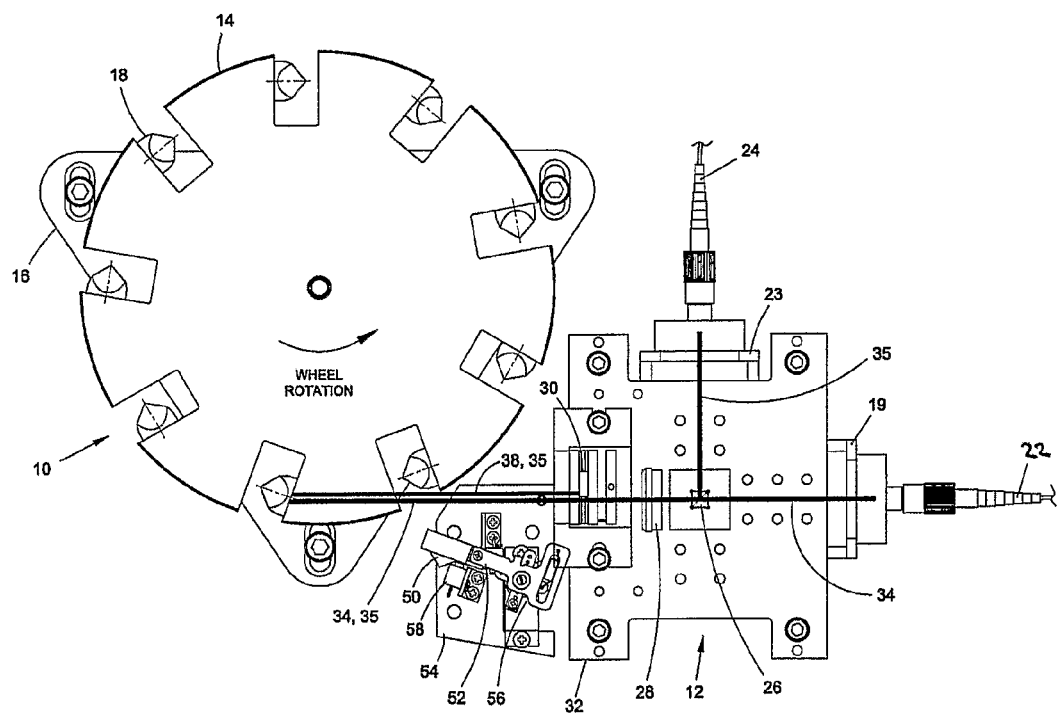
FIG. 1b is a top view of the optical delay line and the optical circulator.

Referring now to FIGS. 1a and 1b an optical delay line device embodying the principles of the present invention is illustrated therein and designated at 10. Although the optical delay line device is shown employed in conjunction with a free-space optical circulator 12, the optical delay line device 10 is suitable for use in any type of optical system requiring the use of an optical delay.

As its primary components, the optical delay device 10 includes a rotating wheel 14 mounted on a plate 16 and a set prisms, such as corner cube prisms 18. The prisms 18 are mounted about a slot 20 in the wheel 14, for example, with a UV curable adhesive, at a fixed radius from the center of the wheel and are oriented to receive/retroreflect a light beam, produced, for example, by a laser, that approaches the wheel in its plane of rotation.

Figure 1C:
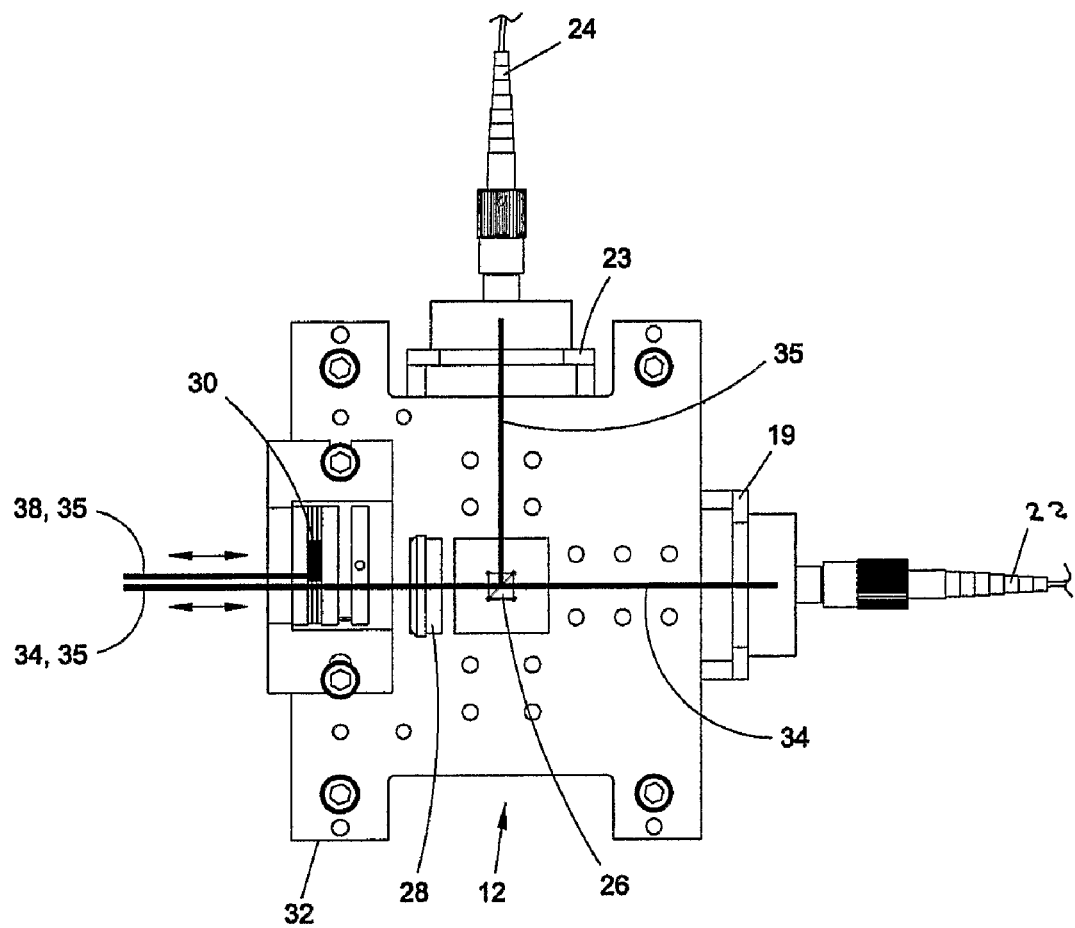
FIG. 1c is a top view of the optical circulator.

Referring also to FIG. 1c, the optical circulator 12 includes an input port 19 coupled to an input fiber 22, an output port 23 coupled to an output fiber 24, a polarizing beam splitter 26, a quarter-waveplate 28, and a surface normal return mirror 30, all of which are mounted on a plate 32. In use, the input fiber 22 emits an incident beam 34, such as laser light, through the beam splitter 26 and the waveplate 28 to each of the prisms 18. The prism 18 reflects the laser light to the return mirror 30, which reflects the light 35 back through the prism 18 and waveplate 28 to the beam splitter 26. The beam splitter 26 directs the reflected laser light, whose polarization is now perpendicular to the polarization of the input beam, to the output fiber 24. The optical delay line 10 and the circulator 12 may be operated under the direction of a controller 33. The incident beam 34 can be collimated electromagnetic radiation. For example, the beam may be a terahertz (THz) beam. A second beam may be split off from the incident beam 34 prior to being delayed.

The corner cube prisms 18 on the rotating wheel 14 impress a continually-varying time delay or phase shift onto the optical beam as the wheel 14 rotates, for example, counterclockwise. In a particular implementation, the orientation of the corner cube prism 18 has one of its three reflecting facets in a plane, that forms a line as it bisects the plane of the wheel, that is also in the plane of the wheel. One prism is typically in play at a time. The plurality of prisms 18 serves to improve on the duty cycle (i.e. reduce the dead time) of the optical delay line 10. The spinning corner-cube prism delay line 10 creates a series of monotonically increasing or (decreasing) optical delays, which are repeated with constant periodicity when the wheel 18 is rotated with a constant rotational velocity, ignoring the dead time for each prism. The period with each rotation is equal to 1/(revolutions/second of wheel*number of prisms). Each angular position of the wheel corresponds to a different optical delay, and the optical delay of each angle is deterministic and repeatable for each rotation. In other words, as the wheel rotates it samples a series of known optical delay states.

The amount of relative time shift can be as short as about 0.001 picoseconds or as long as about several nanoseconds. As the wheel 14 is rotated the beam of laser light 34, either in the form of optical pulses or a narrowband continuous wave from the input fiber 22, passes approximately tangent to the wheel 14 enters one of the prisms 18. The beam diameter is kept small with respect to the prism's entrance face. The prism 18 retroreflects the beam to cause a delay or phase shift to the beam as the wheel 14 rotates.

Specifically, the beam 34 is first directed through the slot 20 to the outer half of the prism's main surface or window, that is, the half that is furthest from the wheel's center of rotation. The light 38 internally reflects off the three back facets of the prism 18 and exists through the second or inner half of the main surface antiparallel and laterally displaced from the incident beam 34. It is then directed to the stationary surface-normal mirror 30 aligned normal to the beam 34 to return the beam 35 precisely along the same path it took the first time through the prism 18, such that the incoming or incident beam 34 and the returning delayed beam 35 exiting the prisms 18 are overlapping, counter-propagating beams. This results in a double pass through the prism 18 with the returning beam 35 antiparallel and now collinear to (that is, not displaced from) the original beam. As the wheel 14 rotates the prism's position changes and the beam entering the prism encounters a different delay or phase shift. Note that as the prism 18 moves through its arc it is slightly rotating relative to the optical beam. It is the nature of a corner cube prism to maintain precise parallelism between the incident 34 and emerging beams 38 even while moving. However, the prism's rotation and lateral displacement as it moves through its arc does cause the emerging beam 38 on its first pass to be continually displaced from the incident beam 34. It is the function of the surface normal mirror 30 to correct for this continual displacement by redirecting the beam back onto itself. It should be noted that the prism wheel 14 and its rotating mechanism need not be rigidly mounted to the other optical components, provided the prisms 18 are polished to yield minimal deviation between the entering and exiting beams 34, 35, respectively, and that the surface-normal mirror 30 accurately retroreflects the beam. After the second encounter with the prism 18, the counter-propagating beam can be separated from the incident beam using, for example, an optical circulator or the polarizing beam splitter 25, to direct the retuning beam 35 90° to the output port 23. The circulator can be a free-space circulator or a fiber-type circulator. Alternatively, a partially transparent mirror, such as a pellicle, can be used to separate the counter-propagating beams.

A variation on this optical configuration involves a pair of porro or right-angle prisms replacing the corner cube prism. In this configuration, one of the two porro prisms in play is positioned in place of the corner-cube prism on the rotating wheel 14 while the second porro prism is mounted with its main surface in the same plane as the first prism only rotated to be orthogonal to the first. The second prism is positioned in front of the stationary surface-normal mirror. In effect, this configuration requires only one additional prism, the fixed prism mounted in front of the surface-normal mirror 30. The prism mounted on the wheel is oriented similarly to the corner cube prism only now the planes of its two reflecting facets are perpendicular to the plane of the wheel 14. Now, the light enters and exits the moving prism 18 in the plane of the rotating wheel 14 and is directed to the stationary porro prism, where it enters and exists in the plane orthogonal to the beams entering and existing the first prism. The light exiting the stationary prism then impinges on the surface-normal mirror 30, which, like the corner-cube configuration, redirects the beam along its original path.

The double pass through the prism 18 amounts to a four-fold delay with the maximum timing delay of: $\Delta t = 4(\Delta Z)/c$, where $\Delta Z$ is the difference in path lengths for the prism at its minimum and maximum wheel positions and c is the speed of light. A four-pass configuration through the prism is also possible, allowing for an eight-fold timing delay. The maximum and minimum points are determined by the size of the spinning wheel and the number of prisms positioned along the circumference. In principle, a single prism 18 will suffice to create a delay between the laser beam that passes through the prism and a second non-delayed beam. However, the greater the number prisms 18 employed the greater use of the laser beam, which amounts to increased signal-to-noise. The maximum number of prisms (approximately evenly spaced along the circumference) is determined by the required delay. In the embodiment shown in FIGS. 1a and 1b, a 6-inch diameter wheel can be used with 9 prisms angularly spaced from one another by about 40 degrees along the wheel's circumference. This provides approximately 300 ps of delay before the prism in play walks out of the beam path and the next prism on the wheel enters the beam path. If a shorter delay is desirable, then a wheel with a smaller radius can be employed. Depending upon the application of the optical delay line 10, the diameter of the wheel 14 can be less than one inch or as large as about 100 inches. The number of prisms 18 mounted to the wheel 14 can vary from one to about 1000. The wheel 14 can be stationary or it can be rotated at speeds up to about 10,000 rpm.

Figure 3A:
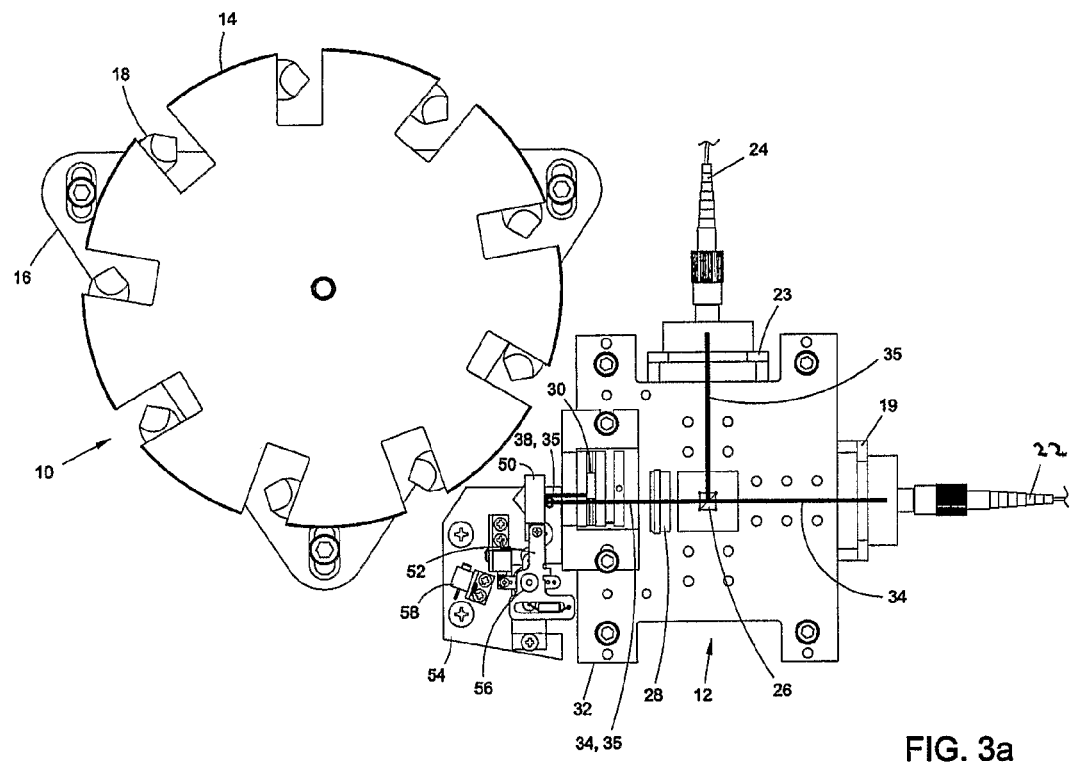
FIG. 3a is a perspective view of the optical delay line and optical circulator with a retractable stationary prism in a closed position.
Figure 3B:
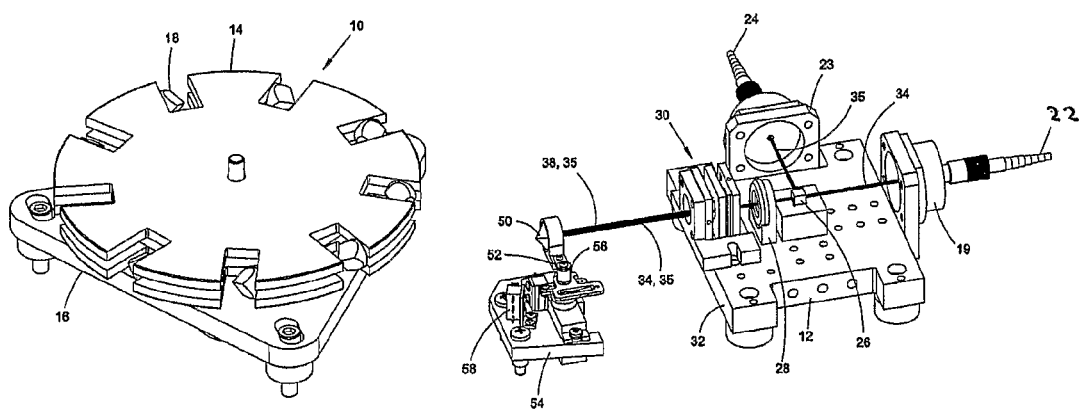
FIG. 3b is a top view of the optical delay line, optical circulator, and stationary prism.
Figure 4A:
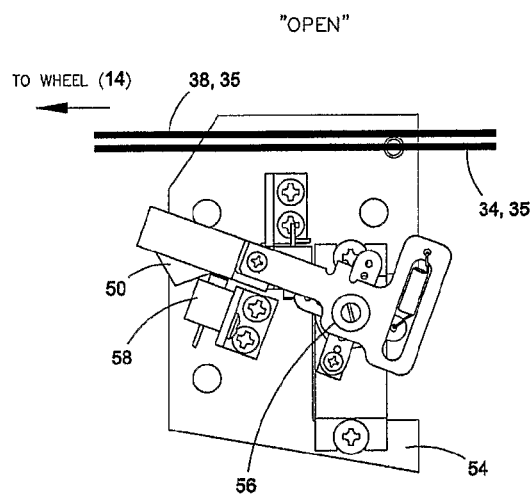
FIG. 4a is a top view of the stationary prism in an open position.
Figure 4B:
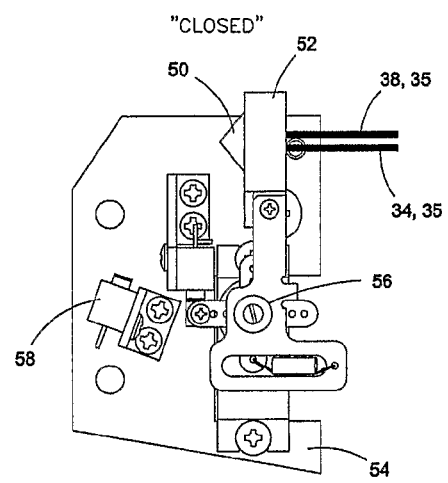
FIG. 4b is a top view of the stationary prism in a closed position.

As shown in FIGS. 3a and 3b, the varying delay can be deactivated by intercepting the beam 34 prior to its arrival to the delay wheel with a stationary retractable prism 50, which may be similar to the prisms 18, that sends the beam along the same four-fold path only without introducing a variable delay. As shown more particularly in FIGS. 4a and 4b, the prism 50 is attached to an arm 52 mounted to a plate 54 so that the arm 52 and hence the prism 50 rotates about a pivot point 56. In the "open" position, the prism 50 rests against a stop 58 such that the prism 50 does not intercept the incident beam 34. In the "closed" position, the prism 50 is rotated to intercept the incident beam 34 such that a variable optical delay is not imparted on the return beam 35. A fixed delay may also be generated if the wheel 14 remains stationary at a fixed position.

Figure 2:
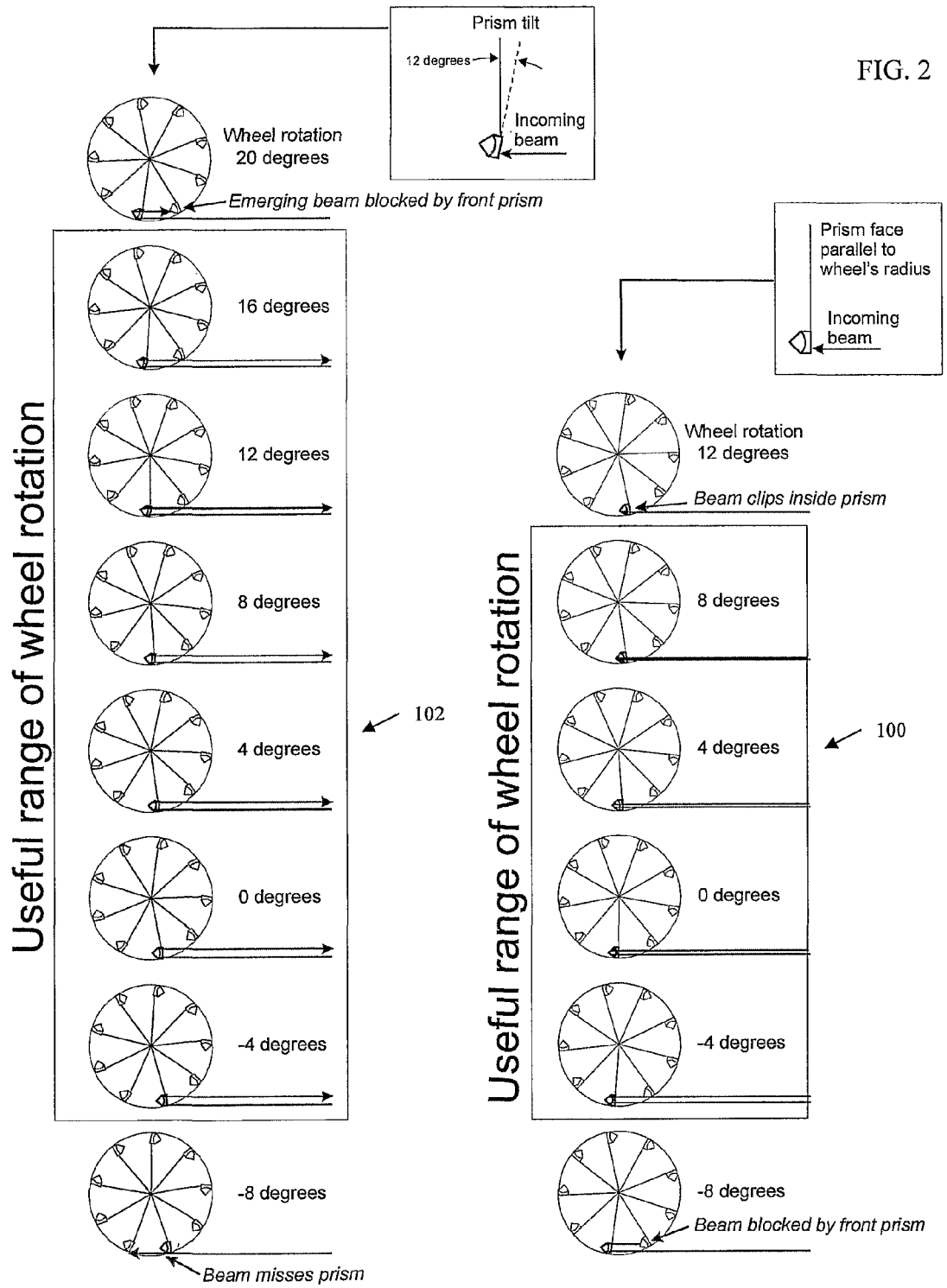
FIG. 2 illustrates a comparison between useful range of wheel rotation of the optical delay line with tilted and non-tilted prisms.

A certain amount of unusable time (dead time) results because of the number of prisms 18 on the wheel 14, the diameter of the wheel 14, the diameter of the laser beam, the bevels and shank height of the prisms 18 and the precision of the facets on each of the prisms. A duty cycle (useful time-to-dead time) as high as about 90% is achievable in certain implementations. The delay duty cycle can be increased by tilting each of the prisms 18 on the wheel 14, as illustrated in FIG. 2, which shows the useful range of wheel rotation for each prism when the prism face is parallel to the wheel's radius 100 and when the window or main surface of each prism is tilted about 12° related to the wheel's radius 102. In some implementations, the prisms are tilted or angled up to about 20°. Hence, when the prism is tilted, the useful range is about 20° whereas when the prism is not tilted the useful range is about 12°. Tilting the prism has the effect of keeping the input and output beams close to one another (i.e. near the prism's apex) during the point in the wheel's rotation where the prism in front of the one in play threatens to block the output beam.

In certain embodiment, an encoder 37 linked directly to a motor 39 that rotates the wheel 14 provides the wheel's angular position and therefore the prism's location along the optical beam path. Each encoder position correlates with a unique position of the prism 18 with respect to the beam 34 and hence with a unique delay time. Precise calibration of delay in the delay line 10 can be accomplished using a calibrated (traceable) delay line, whereby a known amount of optical delay is introduced to the beam path and the delay wheel for the delay line being calibrated is then rotated to restore the amount of delay to zero. The wheel's position, through its encoder value, is then noted and this value is placed in a lookup table. The calibrated delay line then moves to the next delay position and the wheel is again rotated to return to zero delay. This process is repeated for the full time window that the moving prism is in play and is then repeated for all the prisms on the wheel. At the completion of this process, a correlation between each prism's position, via the encoder's value, and the optical delay imposed by the prism is made.

A calibration routine may be implemented in the controller 33 to compensate for amplitude variations in the beam as the wheel 14 rotates. The encoder 37 may be in communication with the controller 33 and a calibration routine may be implemented in the controller to compensate for any nonlinear time delay that occurs as the wheel 14 rotates. A feedback process may be implemented in the controller 33 to correct for power fluctuations, such as to prism fluctuations. The controller 33 may be implemented with an algorithm to normalize a return signal from the optical delay line device 10. Such an algorithm may be based on a linear or nonlinear formula, which may be empirically determined.

In particular implementations, each of the corner cube prisms 18 has a diameter in the range between about ¼ inch and several inches. The optical delay line device 10 may be used in conjunction with a THz transmitter and a THz receiver, which may be components of a THz imaging system. The bias applied to the THz transmitter or the gain to the THz receiver may be modulated to compensate for fluctuating optical power.

In accordance with various embodiments of the invention, other configurations may be implemented. For example, referring to FIGS. 5a and 5b, there is shown a system in which the optical delay line device 10, circulator 12, stationary prism 50 are used in conjunction with another delay line device 10', circulator 12', and prism 50'. Since the components of the delay line device 10', the circulator 12', and the support structure for the prism 50' are similar to those of the delay line device 10, the circulator 12, and the prism 50, like reference numerals with a "prime" are used to identify the components. Note that any of the aforementioned features for the delay line device 10, the circulator 12, and the prism 50 can be incorporated in the delay line device 10', the circulator 12', and the prism 50'. For example, the prisms 18' and 50' may be corner cube prisms or porro prisms.

Figure 5A:
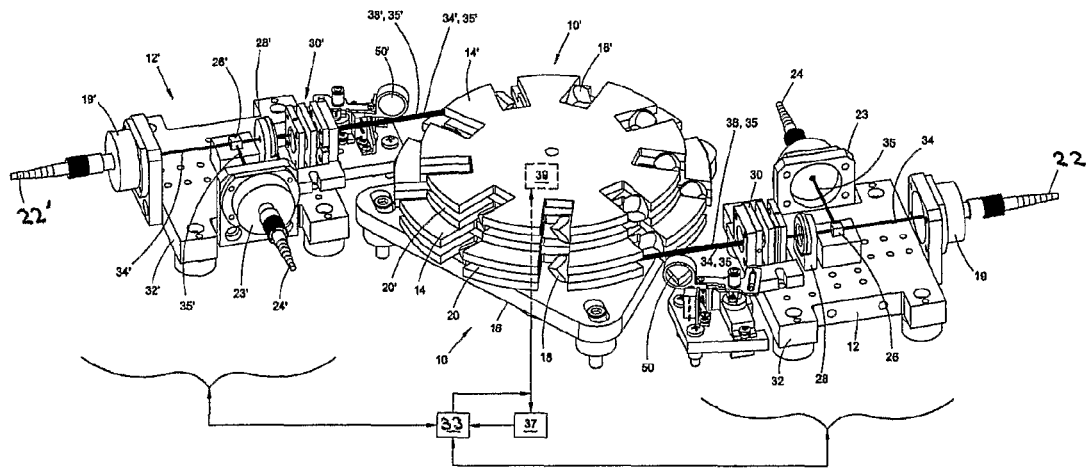
FIG. 5a is a perspective view of a dual optical delay line in accordance with another embodiment of the invention.
Figure 5B:
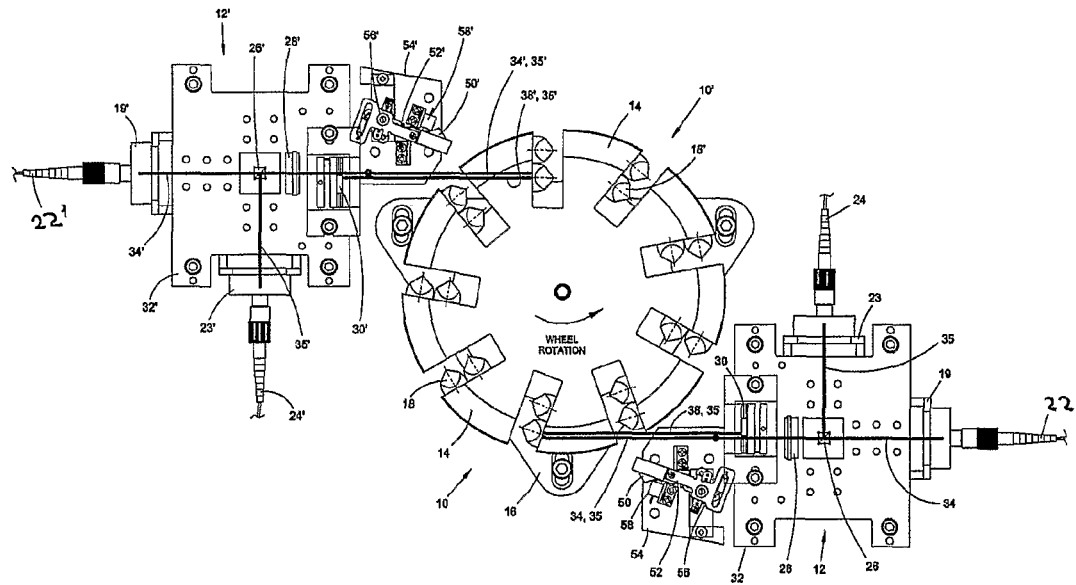
FIG. 5b is a top view of the dual optical delay.

In the implementation shown in FIGS. 5a and 5b, the delay line device 10' includes a wheel 14' and a set of prisms 18' mounted about a slot 20' in the wheel 14' at a fixed radius from the center of the wheel that is different than the radius at which the prisms 18 are mounted in the wheel 14. Thus, when two separate beams 34, 34' are introduced to the respective wheels 14, 14', each beam 34, 34' accesses its own set of prisms 18, 18' and thus encounters its own amount of delay for a given amount of rotation of the wheel 14, and hence the wheel 14'. The net delay between the two beams 34, 34' is, therefore, the difference in delay times produced by the delay line devices 10 and 10'.

Figure 6A:
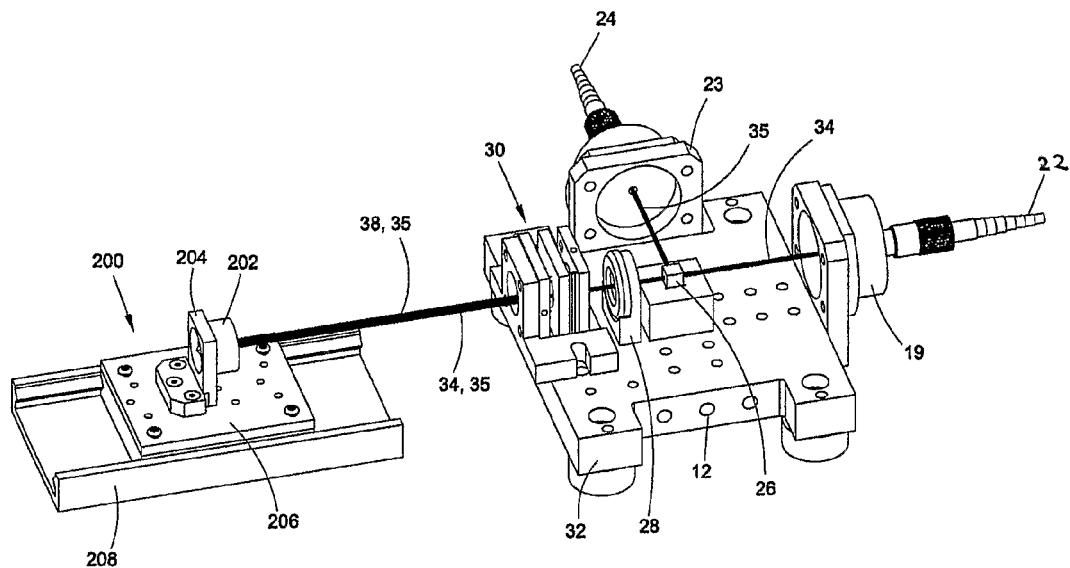
FIG. 6a is a view of an optical delay line in accordance with yet another embodiment of the invention.
Figure 6B:
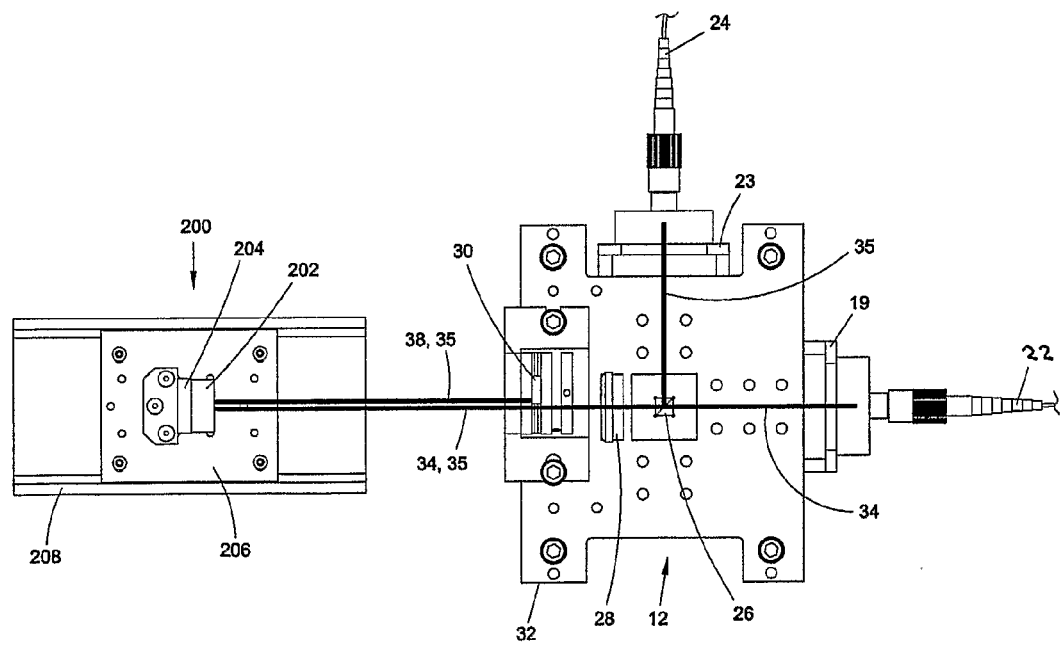
FIG. 6b is a top view of the optical delay line of FIG. 6b.

In yet another embodiment shown in FIGS. 6a and 6b, a delay line device 200 includes a prism 202 mounted on bracket 204, which in turn is attached to a slide 206. The slide 206 is positioned in a rail 208 in a manner to allow the slide 206, and hence the prism 202, to reciprocate back and forth in the rail 208. The prism 202 can be corner cube prism 202 or a porro prism. Thus, as the slide 206 reciprocates, the prism 202 retroreflects the optical beam 34 that is directed along the path of motion of the prism 202 to cause a delay or phase shift to the beam. In another embodiment, the prism 202 can be attached to a pivoting arm, so that as the arm pivots, the moving prism 202 retroreflects the optical beam to produce a delay or phase shift.

As a person skilled in the art will readily appreciate, the above description is meant as an illustration of an implementation of the principles this invention. This description is not intended to limit the scope or application of this invention in that the invention is susceptible to modification, variation and change, without departing from the spirit of this invention, as defined in the following claims.

What is claimed is:

1. A device for varying a delay of an optical beam comprising:
    a rotatable wheel;
    a first set of one or more prisms mounted about a circumference of the rotatable wheel and positioned to retroreflect the optical beam that passes approximately tangent to the rotatable wheel to cause a delay or phase shift to the beam as the rotatable wheel rotates; and
    a plane-surface mirror mounted stationary with respect to an axis of the rotatable wheel and aligned substantially normal to the beam that exits each of the one or more prisms of the first set of prisms to cause the exiting beam to return along a same path that it made on its first pass through each of the one or more prisms of the first set of prisms, resulting in a second pass through each of the one or more prisms of the first set of prisms.

2. The device of claim 1 further comprising an encoder attached to the rotating wheel to allow measurement of an angular position of the wheel and hence a prism's location of the first set of prisms along an optical beam path.

3. The device of claim 1 wherein the one or more prisms are corner cube prisms.

4. The device of claim 1 wherein the one or more prisms are porro prisms.

5. The device of claim 1 wherein a delayed returning beam that exits each of the one or more prisms of the first set of prisms after a delayed returning beam's second pass is separated from an overlapping, counter-propagating incoming beam.

6. The device of claim 1 further comprising an optical circulator to separate counter propagating beams.

7. The device of claim 1 wherein the one or more prisms of the first set of prisms are placed near the circumference of the wheel, each prism having its main surface or window angled between about 0° and 20° relative to the radius of the wheel.

8. The device of claim 1 wherein moving the one or more prisms of the first set of prisms causes an optical path length to increase or decrease.

9. The device of claim 1 wherein the diameter of the wheel is from less than about 1 inch to about 100 inches and the number of prisms is 1 to about 1000.

10. The device of claims 1 wherein the beam is a collimated electromagnetic radiation beam.

11. The device of claims 1 wherein a second beam is split off from a first beam prior to being delayed.

12. The device of claim 1 wherein two separate beams are introduced to the wheel, each beam accessing its own set of prisms on the wheel and thus encountering its own amount of delay for a given amount of wheel rotation.

13. The device of claim 12 wherein a net delay between the two beams accessing the two sets of prisms is the difference in delay times encountered by the two beams.

14. The device of claim 1 wherein a face of each of the one or more prisms of the first set of prisms is angled relative to the radius of the wheel is set to about 12° to maximize the duty cycle.

15. The device of claim 1 further comprising a controller implemented with a calibration routine to compensate for amplitude variations in the beam as the wheel rotates.

16. The device of claim 1 further comprising a controller implemented with a calibration routine to compensate for any nonlinear time delay that occurs as the wheel rotates, the calibration routine being referenced against a known time delay using a calibrated delay line to generate a look-up table, the calibration routine also compensating for rate of change in a size of a delay window.

17. The device of claim 1 further comprising a prism that intercepts an incoming beam to provide a fixed optical delay.

18. The device of claim 1 wherein the one or more prisms are corner cube prisms, each prism having a diameter between about ½ and several inches.

19. The device of claim 1 wherein the wheel holding the one or more prisms generates fixed delay by remaining stationary at a fixed position.

20. The device of claim 1 wherein the wheel holding rotates from about 0 rpm to greater than 10,000 RPM.

21. The device of claim 1 wherein the one or more prisms are held in place using UV curing adhesive that attaches a front of the prism to a slotted face of the wheel.

22. The device of claim 1 further comprising a controller implemented with a feedback process to correct for power fluctuations.

23. The device of claim 1 wherein the device is used in conjunction with a THz transmitter and a THz receiver, a bias applied to the THz transmitter or a gain of the THz receiver being modulated to compensate for fluctuating optical power.

24. The device of claim 1 further comprising a controller implemented with an algorithm to normalize a signal returned from the delay.

* * * * *

UNITED STATES PATENT AND TRADEMARK OFFICE
CERTIFICATE OF CORRECTION

PATENT NO. : 8,390,910 B2
APPLICATION NO. : 11/576215
DATED : March 5, 2013
INVENTOR(S) : Zimdars et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1645 days.

Signed and Sealed this
First Day of September, 2015

Michelle K. Lee
*Director of the United States Patent and Trademark Office*